Figure 1:
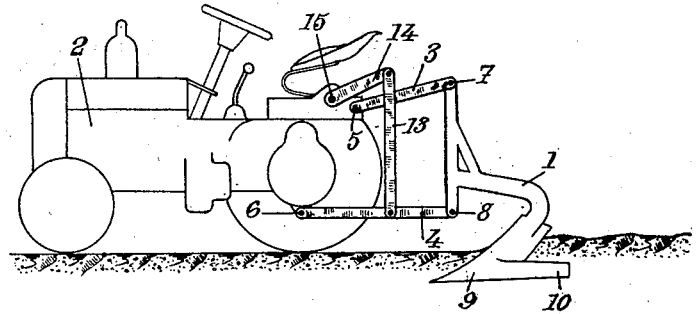

March 17, 1964  G. J. SEGUENOT  3,125,168
TRACTOR HITCH CONTROL DEVICES
Filed March 21, 1960  2 Sheets-Sheet 1

INVENTOR

BY

ATTORNEY

March 17, 1964    G. J. SEGUENOT    3,125,168
TRACTOR HITCH CONTROL DEVICES
Filed March 21, 1960    2 Sheets-Sheet 2

INVENTOR

BY

ATTORNEY

United States Patent Office 3,125,168
Patented Mar. 17, 1964

3,125,168
TRACTOR HITCH CONTROL DEVICES
Gabriel Jean Seguenot, Paris, France, assignor to Societe d'Etudes et de Recherches Techniques Sertec, Paris, France, a society of France
Filed Mar. 21, 1960, Ser. No. 16,280
Claims priority, application France July 17, 1956
3 Claims. (Cl. 172—465)

The present invention relates to tractor hitch control devices, and more specifically to devices for controlling and regulating the conditions of operation of agricultural implements hitched to tractors and which include elements such as ploughshares, tines or the like intended to penetrate to some depth into the ground.

In the following description, and merely for purposes of clarity, the agricultural implement hitched to the tractor will be assumed to be a plough having a single ploughshare.

In the same non-limitative fashion, the work of the agricultural implement will be called "ploughing."

The hitch linkage system for coupling the plough to the tractor is of the type generally referred to as a "three-point hitch," which comprises two lower links and one upper link, each pivoted about horizontal axes to the tractor and to the plough.

The present invention is concerned with systems in which a one-way hydraulic ram, including a cylinder fixed to the tractor and a piston slidable in said cylinder, has the piston operatively connected with the linkage system so as to control the position of the implement with respect to the tractor, the liquid in the variable volume chamber of said ram being, in some conditions of operation, kept at a given pressure (the ram piston being then permitted to move in the cylinder) to permit some load transfer from the implement to the rear wheels of the tractor. But in such systems, it was impossible to adjust the pressure to the exact value corresponding to the maximum possible load transfer.

According to the present invention, means are provided for entirely closing the variable volume chamber of the ram so that if the implement, adjusted to the desired depth of ploughing, is then towed by the tractor in the ground to the ploughed, the pressure then prevailing in said chamber is equal to the above mentioned value for obtaining the maximum load transfer. Pressure adjusting means operated either manually after reading of this value during a preliminary run of the tractor, or automatically during the beginning of the ploughing operation, is provided for maintaining in the variable volume chamber of the ram the exact pressure to obtain the maximum load transfer from the implement to the tractor.

Preferred embodiments of the present invention will be hereinafter described with reference to the accompanying drawings given merely by way of example and in which:

FIG. 1 shows diagrammatically a side elevation of a tractor to which a plough is hitched according to the invention.

Figure 2:
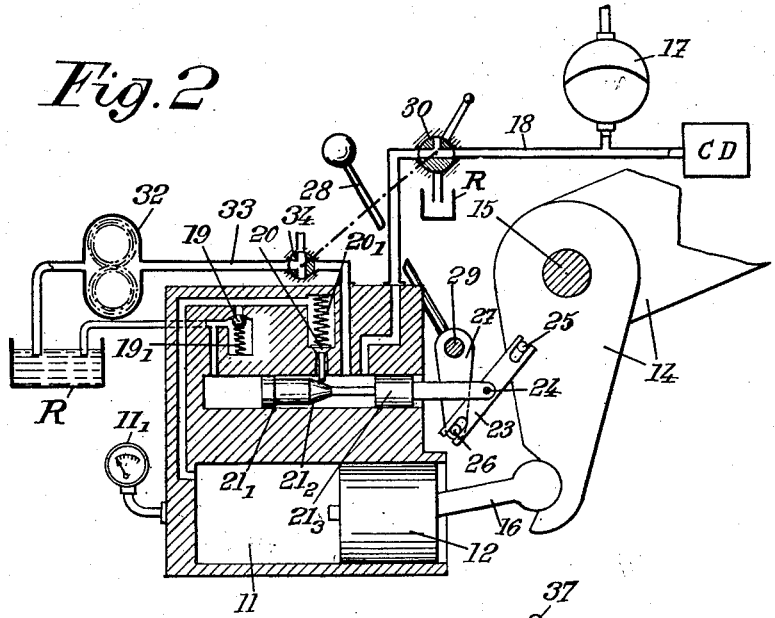
Figure 3:
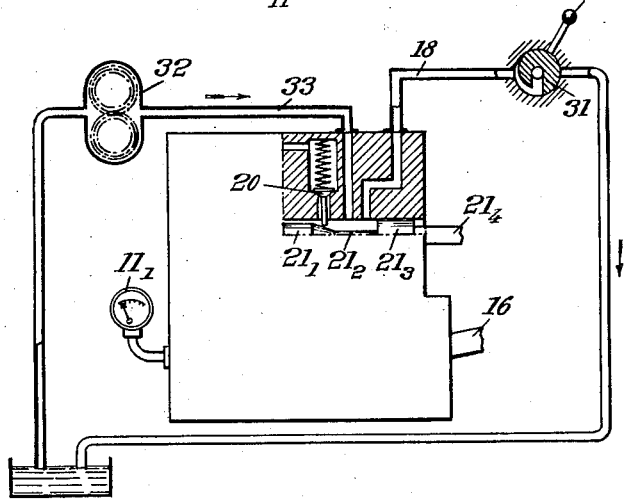

FIGS. 2 and 3 diagrammatically show two devices according to the invention where the pressure to be maintained in the ram variable volume chamber is manually adjusted after a reading is taken during a preliminary run of the tractor.

Figure 4:
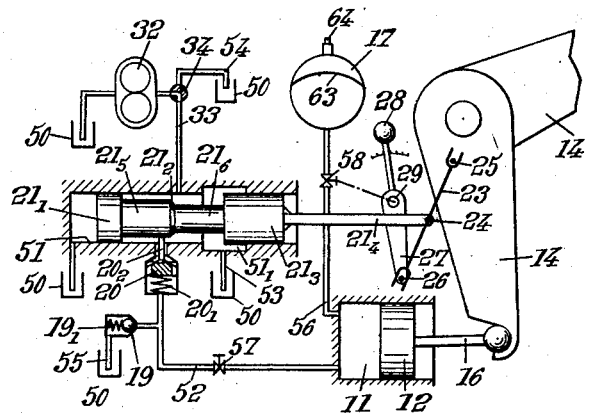

FIG. 4 diagrammatically illustrates a device according to the invention where this pressure is automatically obtained.

Figure 5:
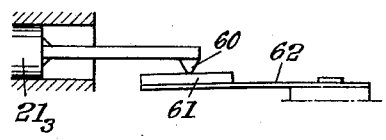
Figure 6:
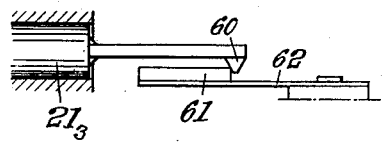

FIGS. 5 and 6 diagrammatically show a detail of the device of FIG. 4 for two different positions of the distributing valve forming part of said device.

Figure 7:
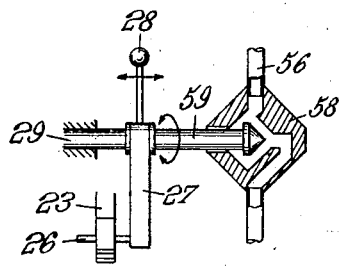

FIG. 7 diagrammatically shows a further detail of said device.

The plough 1 (FIG. 1) is coupled to the tractor 2 by a "three-point" type hitch, which comprises an upper link 3 and two lower links 4, each pivoted at one end to the tractor (the link 3 at a point 5 in the vertical plane of symmetry of the tractor, and the links 4 at two points 6 disposed symmetrically with respect to the said plane). The links are each pivotally connected at the other end to the plough (the link 3 at a point 7 of a substantially vertical body integral with the plough and the two links 4 at points 8 on said body disposed at substantially the same level as points 6).

The plough includes a share 9 having a heel 10.

The tractor carries, fixed thereon, a ram cylinder 11 (FIG. 2) in which is slidable a piston 12. The lower links 4 of the hitch linkage are operatively connected with said piston 12 through connecting rod 13 (FIG. 1) hinged to these links 4 and a crank lever 14 hinged to said connecting rod and mounted to pivot about a shaft 15 fixed to the tractor. Crank lever 14 is connected to piston 12 through a rocker arm 16 (FIG. 2).

This device operates in the following manner:

During a first stage, a certain quantity of oil, which depends upon the desired ploughing depth, is introduced into cylinder 11, and while the tractor is being run forward the plough transmits to piston 12 a thrust which produces a pressure in said oil, and the mean value of this pressure is measured by means of a pressure gauge $11_1$.

Then, in a second stage, a pressure equal to this measured value is applied to piston 12, and at the same time the hitch linkage and therefore the plough are made free for vertical displacement. This necessitates that the piston 12 should be capable of displacement while being constantly urged by a constant pressure maintained in the oil present in cylinder 11, while the volume of the said oil quantity must be able to vary under said constant pressure, and this can be achieved in the manner described below.

The ploughing depth is then practically independent of the position of the tractor with respect to the hitch means.

A discharge valve 19 and a feed check valve 20 (the opening pressures of which are accurately determined by springs $19_1$ and $20_1$) are provided, respectively to avoid excess pressures and to retain the fluid in cylinder 11. Valve 19 opens into reservoir R.

The movements of a distributing valve $21_1$, $21_2$, $21_3$, adapted to cooperate with the rod of valve 20 in order to lift the latter from its seat, are controlled by the movements of lever 14 and of a control member 28 by means of a rod 23 which is simultaneously subjected to the action of the longitudinal displacements of the distributing valve, of the vertical displacements of the plough and of the angular displacements of control member 28. To this end, said rod 23 is mounted so that it can pivot simultaneously on the distributing valve, on one arm of lever 14 and on the control member 27, two of these pivoting connections being arranged to slide transversely in slots or guideways formed in said rod 23.

Thus, rod 23 is pivoted at its middle point 24 on the distributing valve and the two ends thereof are mounted for sliding and pivotal movement along and about axes passing through pivots 25 and 26 which extend parallel to the axis of shaft 15, and respectively integral with crank lever 14 and the base 27 of control member 28 pivotally mounted about a pivot 29 which also extends parallel to the axis of shaft 15.

Finally, a pipe 33, fed with fluid (oil) by a pump 32, and a discharge pipe 18 open into the cylinder housing of the distributing valve members $21_1$, $21_2$, $21_3$.

In order to cause the hitch links to move upwardly, with valve 34 set to communicate pump 32 with the distributing valve housing, control lever 28 is raised, thus displacing the distributing valve toward the left from the position shown in FIG. 2. Discharge pipe 18 is then shut off by the valve portion $21_3$. This increases the pressure of the liquid fed by pump 32, so that valve 20 is lifted and places the pump into communication with cylinder 11. Piston 12 is displaced toward the right and the links are raised.

During this upward movement, control rod 23 pivots about the axis 26, which returns the distributing valve toward the right and, at a certain moment, causes the opening of discharge pipe 18 by the valve element $21_3$. The pressure of the fluid supplied by the pump then drops, valve 20 returns onto its seat and the lifting movement is stopped.

In order to cause the hitch links to move downwardly, the distributing valve is displaced toward the right by lowering lever 28. The conical element $21_2$ of said distributing valve then lifts valve 20. The oil contained in cylinder 11 escapes into discharge pipe 18, which is open. Piston 12 is displaced toward the left by the pressure of lever 14, thus causing the distributing valve to move toward the left, so that, finally, the conical element $21_2$ leaves valve 20 which returns onto its seat, and the downward movement of the hitch links is stopped.

It will thus be seen that a well-defined stable position of lever 14 and a well-defined quantity of oil in cylinder 11 correspond to any position of control lever 28.

In order to effect the first stage above referred to, it therefore suffices suitably to position lever 28 in accordance with the depth required for ploughing, after which the pressure developed in the oil which is then enclosed in cylinder 11 is measured during the beginning of the ploughing operation.

In order then to proceed to the second stage above referred to, it is necessary constantly to maintain the pressure thus measured in the oil, while permitting the volume thereof to vary.

For this purpose, I provide in discharge pipe 18 a three-way cock 30 (FIG. 2) and I connect this pipe 18 with one of the following devices:

In the construction of FIG. 2, the pipe 18 is connected to a device forming a constant pressure container, for instance an oleopneumatic accumulator 17 of the diaphragm type supplied from a suitable charging device (shown at CD), the rotations of cock 30 being then gauged with those of another three-way cock 34 mounted on the pipe 33 of pump 32 so that, according to the position of these cocks, it is possible either to connect accumulator 17 with the distributing valve housing and to disconnect pump 32 therefrom, the delivery of said pump being then effected to a sump (not shown) through cock 34, or to disconnect accumulator 17 and to connect pump 32, in which case the liquid delivery can take place through the cock 30. For instance, cocks 30 and 34 are both mounted on the same shaft, diagrammatically illustrated by a dotted line in FIG. 2;

In the construction of FIG. 3, the pipe 18 is connected to a throttling member 31, which opposes to a varying degree the continuous circulation of the liquid supplied by pump 32 in a closed circuit.

The pipe 18 may in fact be connected to any other suitable system for regulating pressure.

The operation of the FIG. 3 device is as follows:

Lever 28 is lowered to its limit position, this bringing distributing valve $21_1$, $21_2$, $21_3$ to its limit position toward the right and lifting valve 20, which is then supported by the cylindrical part $21_1$ of the distributing valve. This position corresponds to the extreme limit of the downward movement of the links if no pressure is applied to the liquid present in the volume formed by the cylinder 11, the distributing valve housing and the pipes.

In the construction of FIG. 2, by manually acting on cock 30, the cylinder 11 is brought into communication with accumulator 17, cock 34 being simultaneously closed.

The pressure in cylinder 11 is then kept at a constant value, although the volume of the oil contained in this cylinder can vary.

The use of the accumulator has the advantage, as compared with the use of the throttling member, that it does not require the pump to operate when the desired pressure has been obtained in the latter.

To sum up, the operation is carried out in the following manner:

When starting to plough, cock 30 is set at discharge to sump R and cock 34 is set for delivery from the pump to the valve housing, and lever 28 is adjusted to a position corresponding to the depth to which it is desired to plough:

The value of the mean pressure indicated by pressure gauge $11_1$ is measured;

The charge of accumulator 17 (or the angular position of throttling member 31) is then adjusted in accordance with this value by any suitable means.

Cock 34 is closed and cock 30 is opened so as to apply the constant pressure which has thus been regulated.

Referring now to the device shown in FIG. 4, therein is shown:

Ram cylinder 11 in which slides piston 12, the latter being pivotally mounted by means of connecting rod 16 on a crank lever 14 or "arm" carrying the hitch linkage;

Control lever 27, 28, pivotally mounted about pivot 29;

Pump 32 which draws in liquid (oil) from a tank 50 and delivers said liquid through a pipe 33 into the cylindrical housing 51 of the distributing valve;

A distributing valve, which comprises two pistons $21_1$, $21_3$, slidable in housing 51 and separated by two cylindrical portions $21_5$ and $21_6$ having different diameters (both diameters being smaller than those of the pistons) and being joined by means of a conical shoulder $21_2$;

Connecting rod 23, pivotally mounted at 24 on an extension $21_4$ of the distributing valve and comprising two forks designed to slide on two fingers 25 and 26 respectively carried by lever 14 and by control lever 27, 28;

Pipe 52 connecting housing 51 with cylinder 11, with the interposition of a valve 20 loaded by a spring $20_1$. The stem $20_2$ of said valve is constantly urged by said spring against the portion of the distributing valve which is interposed between the two pistons;

A number of discharge outlets: including outlet 53, for housing 51, opened only for certain positions of the distributing valve; outlet 54, for pipe 33, controlled by a three-way cock 34; and outlet 55, controlled by a safety valve 19 calibrated by a spring $19_1$;

And pressure accumulator 17.

Instead of connecting accumulator 17 with cylinder 11 through the housing 51 of the distributing valve as in the previous embodiments, it is connected directly to cylinder 11 through a pipe 56.

Advantageously, as shown, stop-cocks 57, 58 are mounted on pipes 52 and 56.

The operation of the device is as follows:

Initially, stop-cock 57 is open and stop-cock 58 closed. Control lever 27—28 is placed in a position corresponding to the desired ploughing depth.

The operation is similar to that above described with reference to FIG. 2, the plough being finally brought into the position ensuring this ploughing depth.

At the end of this operation, discharge 53 remains open, but the small diameter cylindrical portion $21_6$ of the distributing valve is located opposite valve 20 which is applied against its seat. The pressure prevailing in cylinder 11 when the tractor is run has a particular value $p$ corresponding to the ploughing depth required under the particular conditions of work (in particular the nature, degree of compactness and humidity of the ground under cultivation).

Stop-cock 58 is then opened in a manner to be fully explained hereinafter in conjunction with FIG. 7, thus putting the liquid volumes of accumulator 17 and of cylinder 11 into communication.

In general, the pressure initially existing in the accumulator is not equal to the pressure developed in the cylinder. The follow-up device responsive to the position of lever 27, 28 therefore comes again into operation in the manner above described, so as to re-establish the pressure p in the whole of the two liquid volumes in question.

When this has taken place, the plough is stabilized at the desired depth and, valve 20 being closed, the total liquid volume above referred to remains under the constant pressure p while still permitting displacements of piston 12 by virtue of the elasticity of accumulator 17.

As in the previous embodiment, such a device makes it possible to obtain at the same time a constant depth of ploughing and an optimum load transfer to the driving wheels of the tractor.

The dimensions of the device are so adjusted that some limited movement of the links can take place without bringing the control device into operation.

To this end, conical shoulder $21_2$ is located sufficiently far from piston $21_3$ to give the distributing valve the possibility of some axial displacement between the position in which it opens valve 20 and the position in which it closes discharge outlet 53.

The movement which is thus made possible determines the limits between which the accumulator provides a flexible form of hitching between the tractor and the plough, without bringing the control device into action.

The accumulator can also in practice provide for a certain amount of flexibility in the hitching between the tractor and the plough without a substantial change of pressure, if the volume of the accumulator is sufficient.

It is of course understood that stop-cock 58 is not essential. If it were not provided, the total quantity of liquid contained in the accumulator and the cylinder would be brought to pressure p in a single operation, merely in response to the bringing of lever 28 into the desired position.

However, the presence of the stop-cock 58 makes it possible for the operation to be carried out in two stages; the first is a short stage at the commencement of ploughing, during which the share can be rapidly lowered into the ground; the second is a longer stage required for adjustment of the value of the pressure in the accumulator.

It can in fact be an advantage to slow down the action of the follow-up means, so that it comes into action only in the case of changes of consistency of the soil and not in the case of momentary changes in the level of the ground.

In order to permit of rapid movement the tool into the ground at the beginning of the furrow, delaying or slowing-down means could be arranged so as to come into operation only during the second stage, that is to say after the accumulator has been connected to the ram (stage of "adjustment" of pressure in the accumulator).

These means would be especially constituted by:

A pipe connected as a by-pass to the supply of the ram only when the arms move upwardly, and designed to divert a part of this supply to discharge in the form of a "leakage."

And a throttle-valve interposed in the discharge of the ram, only when the arms move downwards.

In order to make provision for these means, pipe 52 could be replaced by two identical pipes, both opening into the housing 51 of the distributor in the same manner as the pipe above referred to (valve 20), but one pipe being fitted with an inlet valve and the other pipe with an evacuation valve. Means operating under the control of stop-cock 58 would then be provided so as to connect up the above-mentioned "leakage" to the admission or charge pipe and the above-mentioned throttle-valve to the evacuation or discharge piping of the ram.

In order to reduce the number of control members, it is an advantage to arrange member 28 so that the latter makes it possible not only to control the upward and downward movement of lever 14, but also the opening and closing of stop-cock 58, these two controls being preferably completely independent of each other.

For this purpose for example, the angular displacements of said member are employed so as to provide the first control while the axial sliding movements of said member are employed to provide the second control.

Thus, member 27—28 (FIG. 7) is mounted freely for rotation on its own shaft 29, but is rigidly fixed to this shaft for axial movement, and these axial movements of translation are used to control stop-cock 58 by means of the sliding movement of a needle-valve 59 rigidly fixed for rotation as shown, or in any other desired manner, especially by converting the said translations into rotation of a rotating part of the stop-cock, by means of a toothed-rack system.

Between the two positions of the distributing valve, corresponding respectively to the closure of discharge 53 (upward movement of the links) and to the forced opening of the valve 20 (downward movement), pump 32 is connected to the discharge through 53. In order to prevent the mouth of said discharge in housing 51 (constituted by the annular space formed between piston $21_3$ and the housing wall in which is provided groove $51_1$) from being too narrow, the result of which would be to require needless and excessive work on the part of the pump, mechanical or hydraulic means is provided for automatically enlarging the opening of this mouth as soon as it is initiated.

These means are constituted for example by a wedge-shaped member 60 (FIGS. 5 and 6) designed to cooperate with an abutment 61 mounted on an elastic strip 62. This strip is deformed by the movement of travel of the distributing valve toward the right (FIG. 5) and as soon as the wedge arrives at the edge of the abutment (in the position which corresponds to the beginning of the opening of the above-mentioned mouth), the elastic deformation of the strip 62 (FIG. 6) displaces the distributing valve very slightly towards the right by virtue of the co-action of the said edge with wedge member 60. A displacement of this nature (of the order of a fraction of a millimeter) is made possible by mounting connecting rod 23 with some play on shaft 24, and is sufficient to connect the pump with the discharge in a correct manner, in particular as soon as valve 20 returns onto its seat at the end of a period of upward movement of lever 14.

Accumulator 17 is preferably an oleo-pneumatic accumulator, an elastic diaphragm 63 being provided to separate an oil chamber from an air chamber which can be inflated through a valve 64 to any desired initial pressure.

This application is a continuation-in-part of my U.S. patent application Ser. No. 672,395, now abandoned, filed July 17, 1957, under the title: "Means for Controlling and Regulating the Working Conditions of Implements, of the Plough Type, Coupled to Tractors."

In a general manner. while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. For use with a ground tilling implement towed by a tractor by means of a three-point hitch including rigid link means pivoted at one end to said tractor and at the other end to said implement: a device for controlling the operation of said implement and comprising a cylinder fixed to said tractor, a piston slidable with a liquid-tight fit in said cylinder so as to form therewith a variable volume chamber filled with liquid, said piston being operatively connected with said link means to control the position thereof with respect to said tractor, a pressure accumulator comprising a vessel supported by said tractor and a resilient diaphragm dividing said vessel into a compartment filled with a gas under pressure and a compartment filled with liquid, means communicating the last mentioned compartment directly with said variable volume chamber of said cylinder, a continuously operating liquid pump supported by said tractor, means fixed to said tractor defining a housing having a cylindrical wall in communication with said pump, said housing being provided with a discharge opening in the cylindrical wall thereof, a conduit in communication with said variable volume chamber and opening into the cylindrical wall of said housing, a spring loaded check valve in said conduit opening toward said variable volume chamber, a slide valve slidably supported in said housing to control the communication between said pump and said discharge opening, said slide valve having a neutral position in which communication between said pump and said discharge opening is established, said slide valve being adapted for displacement thereof from said neutral position in one direction to cut off the communication between said pump and said discharge opening, means carried by said slide valve for cooperating with said check valve for positively opening said check valve upon displacement of said slide valve from said neutral position in a direction opposite said one direction whereby said chamber of said cylinder which is filled with liquid is then placed into communication with said discharge opening, a control lever pivotally supported on said tractor and adapted to occupy with respect thereto a multiplicity of different positions, and follow up means operatively connecting said control lever both with said slide valve and with said link means for operating said two valves for a given position of said control lever and upon displacement of said link means to establish the pressure of the liquid entrapped in said variable volume chamber in accordance with the hardness of the ground so that the position of said piston in said cylinder and that of said tilling implement in the ground are fixed for a given position of said control lever irrespective of the hardness of the ground.

2. A device according to claim 1 further comprising manually operable valve means for cutting off the communication between said cylinder chamber and the liquid filled compartment of said accumulator.

3. A device according to claim 1, further comprising, for operatively connecting said piston with said link means, a rod rigidly connected to said piston, and a crank lever pivotally supported on said tractor and having one end thereof pivotally connected to said rod and the other end thereof pivotally connected to said link means, said follow up means comprising a lever having opposite ends and pivotally connected intermediate said ends to said slide valve, the ends of said last mentioned lever being slidably connected respectively to said control lever and to said crank lever.

References Cited in the file of this patent
UNITED STATES PATENTS

| | | |
|---|---|---|
| 2,455,727 | Bunting | Dec. 7, 1948 |
| 2,689,513 | Ferguson et al. | Sept. 21, 1954 |
| 2,715,863 | Bunting | Aug. 23, 1955 |
| 2,893,194 | Lamouria | July 7, 1959 |